United States Patent
Ranade

(10) Patent No.: US 8,281,096 B1
(45) Date of Patent: Oct. 2, 2012

(54) SYSTEMS AND METHODS FOR CREATING SNAPSHOTS

(75) Inventor: Dilip Ranade, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 219 days.

(21) Appl. No.: 12/792,439

(22) Filed: Jun. 2, 2010

(51) Int. Cl.
*G06F 12/00* (2006.01)
(52) U.S. Cl. .................. 711/162; 711/103; 711/161
(58) Field of Classification Search .............. 711/162, 711/103
See application file for complete search history.

(56) References Cited

U.S. PATENT DOCUMENTS

| | | | |
|---|---|---|---|
| 7,870,356 B1 * | 1/2011 | Veeraswamy et al. | 711/162 |
| 2003/0025930 A1 * | 2/2003 | Tateyama | 358/1.14 |
| 2006/0015676 A1 * | 1/2006 | Oribe et al. | 711/103 |
| 2007/0118687 A1 * | 5/2007 | McGovern et al. | 711/112 |
| 2010/0011368 A1 * | 1/2010 | Arakawa et al. | 718/104 |
| 2011/0082966 A1 * | 4/2011 | Yu et al. | 711/103 |

* cited by examiner

*Primary Examiner* — Hashem Farrokh
(74) *Attorney, Agent, or Firm* — Advantedge Law Group

(57) ABSTRACT

A computer-implemented method for creating snapshots may include identifying a request to take a snapshot of a primary volume of data. The computer-implemented method may also include identifying a write-once block device configured to receive data for the snapshot. The computer-implemented method may further include identifying an attempt to write to a block of the primary device. The computer-implemented method may additionally include copying the block to the write-once block device before allowing the write attempt to write to the block of the primary volume. Various other methods, systems, and computer-readable media are also disclosed.

18 Claims, 6 Drawing Sheets

SYSTEMS AND METHODS FOR CREATING SNAPSHOTS

BACKGROUND

Organizations increasingly generate and use large amounts of data. In the course of managing its data, an organization may wish to back up this data while maintaining uninterrupted access to the same.

Creating a consistent backup may involve backing up all data within a backup reflect the state of the backed-up data at a given point in time. In order to provide a consistent backup of a volume of data (as well as uninterrupted access to write to the volume), a backup system may utilize a space-saving snapshot. Traditional technologies may create a space-saving snapshot of a volume by making a copy of a block of data on the volume whenever that block of data is about to be overwritten. Attempts to read from the snapshot may then be either directly fulfilled from the volume (if the corresponding block on the volume has not changed since the snapshot) or fulfilled from a copied block of data created for the snapshot.

In order to locate copied blocks of data when fulfilling read requests for a snapshot, traditional technologies may maintain a map that identifies the location where each copied block of data is stored. Furthermore, traditional technologies may maintain a map of which blocks of data have been copied for the snapshot. Unfortunately, maintaining such maps may degrade system performance, particularly in the context of a cluster. For example, if a cluster of systems have access to write to a volume of the snapshot and/or need access to the snapshot, then synchronizing the maps across various nodes within the cluster may increase I/O latency and network traffic. Accordingly, the instant disclosure addresses a need for efficiently creating snapshots.

SUMMARY

As will be described in greater detail below, the instant disclosure generally relates to systems and methods for creating snapshots. Embodiments of the instant disclosure may create a snapshot by performing copy-on-write operations to a write-once block device. The write-once block device may have various properties (e.g., allowing only one write per block address, sparseness, invalid read handling, etc.) to ensure that the snapshot is created accurately and can be read from without requiring other systems (such as nodes in a cluster) to track detailed information about the snapshot. For example, a method may include identifying a request to take a snapshot of a primary volume of data, identifying a write-once block device configured to receive data for the snapshot, identifying an attempt to write to a block of the primary volume, and then copying the block to the write-once block device before allowing the write attempt to write to the block of the primary volume.

The write-once block device may have a variety of properties. For example, the write-once block device may be configured to signal an error on an attempt to read from an unwritten block. Accordingly, in some examples the method may also include identifying an attempt to read an additional block from the snapshot, receiving a message from the write-once block device indicating that the additional block has not been written to the write-once block device, and then fulfilling the read attempt from the primary volume. In some examples, the method may also include identifying an attempt to read the block from the snapshot and then retrieving the block from the write-once block device.

In some examples, the write-once block device may include a sparse device. In various examples, the method may also include initializing the write-once block device to an empty state. The write-once block device may include a variety of components and be realized in a variety of ways. For example, the write-once block device may include a virtual device, a virtual hard disk, and/or a thin-provisioned array device.

The write attempt may occur in a variety of contexts. For example, the write attempt may be performed by a node in a cluster of computing systems with access to the primary volume. In this context, the method may also include recording, in a tracking structure on the node, an indication that the block has changed since the snapshot. The method may also include identifying an additional attempt to write to the block, determining from the tracking structure that the block has changed since the snapshot, and then allowing the additional write attempt without copying the block to the write-once block again. In some examples, the method may also include identifying an internode communication between the node and an additional node in the cluster and then including information from the tracking structure with the internode communication. Additionally or alternatively, the method may include asynchronously transmitting information from the tracking structure to an additional node in the cluster.

In some examples, a system for creating snapshots may include an identification module, an interception module, and a copying module. The identification module may be programmed to identify a request to take a snapshot of a primary volume of data and to identify a write-once block device configured to receive data for the snapshot. The interception module may be programmed to identify an attempt to write to a block of the primary volume. The copying module may be programmed to copy the block to the write-once block device before allowing the write attempt to write to the block of the primary volume.

The write-once block device may have a variety of properties. For example, the write-once block device may be configured to signal an error on an attempt to read from an unwritten block. Accordingly, in some examples the system may also include a reading module programmed to identify an attempt to read an additional block from the snapshot, receive a message from the write-once block device indicating that the additional block has not been written to the write-once block device, and then fulfill the read attempt from the primary volume. In some examples, the reading module may also be programmed to identify an attempt to read the block from the snapshot and then retrieve the block from the write-once block device.

In some examples, the write-once block device may include a sparse device. In various examples, the system may also include a module to initialize the write-once block device to an empty state. The write-once block device may include a variety of components and be realized in a variety of ways. For example, the write-once block device may include a virtual device, a virtual hard disk, and/or a thin-provisioned array device.

The write attempt may occur in a variety of contexts. For example, the write attempt may be performed by a node in a cluster of computing systems with access to the primary volume. In this context, the system may also include a tracking module programmed to record, in a tracking structure on the node, an indication that the block has changed since the snapshot. The tracking module may also be programmed to identify an additional attempt to write to the block, determine from the tracking structure that the block has changed since the snapshot, and then allow the additional write attempt without copying the block to the write-once block again. In some examples, the tracking module may also be programmed to identify an internode communication between the node and an additional node in the cluster and then include information from the tracking structure with the internode communication. Additionally or alternatively, the tracking module may be programmed to asynchronously transmit information from the tracking structure to an additional node in the cluster.

In some embodiments, a computer-readable-storage medium may include one or more computer-executable instructions that, when executed by at least one processor of a computing device, cause the computing device to identify a request to take a snapshot of a primary volume of data, identify a write-once block device configured to receive data for the snapshot, identify an attempt to write to a block of the primary volume, and then copy the block to the write-once block device before allowing the write attempt to write to the block of the primary volume.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
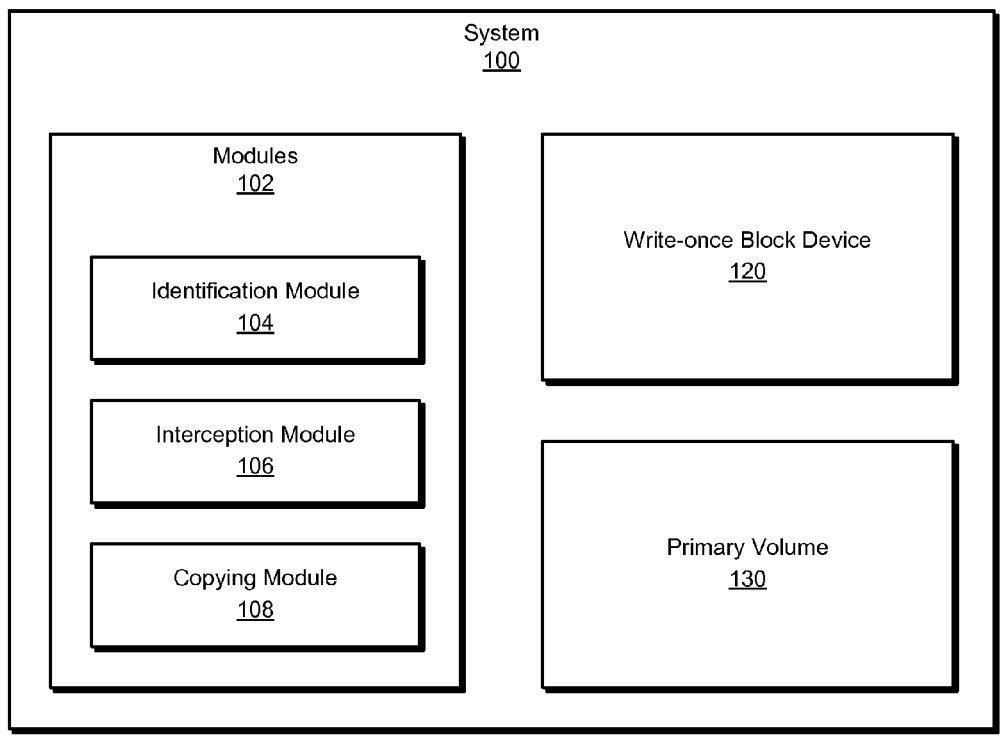
FIG. 1 is a block diagram of an exemplary system for creating snapshots.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for creating snapshots. Systems and methods described herein may create a snapshot by performing copy-on-write operations to a write-once block device. The write-once block device may have various properties (e.g., allowing only one write per block address, sparseness, invalid read handling, etc.) to ensure that the snapshot is created accurately and can be read from without requiring other systems (such as nodes in a cluster) to track detailed information about the snapshot. By writing to and reading from the write-once block device for snapshot operations, systems and methods described herein may create a snapshot for a volume accessible by a cluster without requiring that nodes of the cluster keep track of and synchronize information about the snapshot, such as which blocks of the volume have changed since the snapshot and/or the locations of blocks in the snapshot. Eliminating these requirements may reduce I/O latency, network traffic, and/or other computing resources for the cluster.

Figure 2:
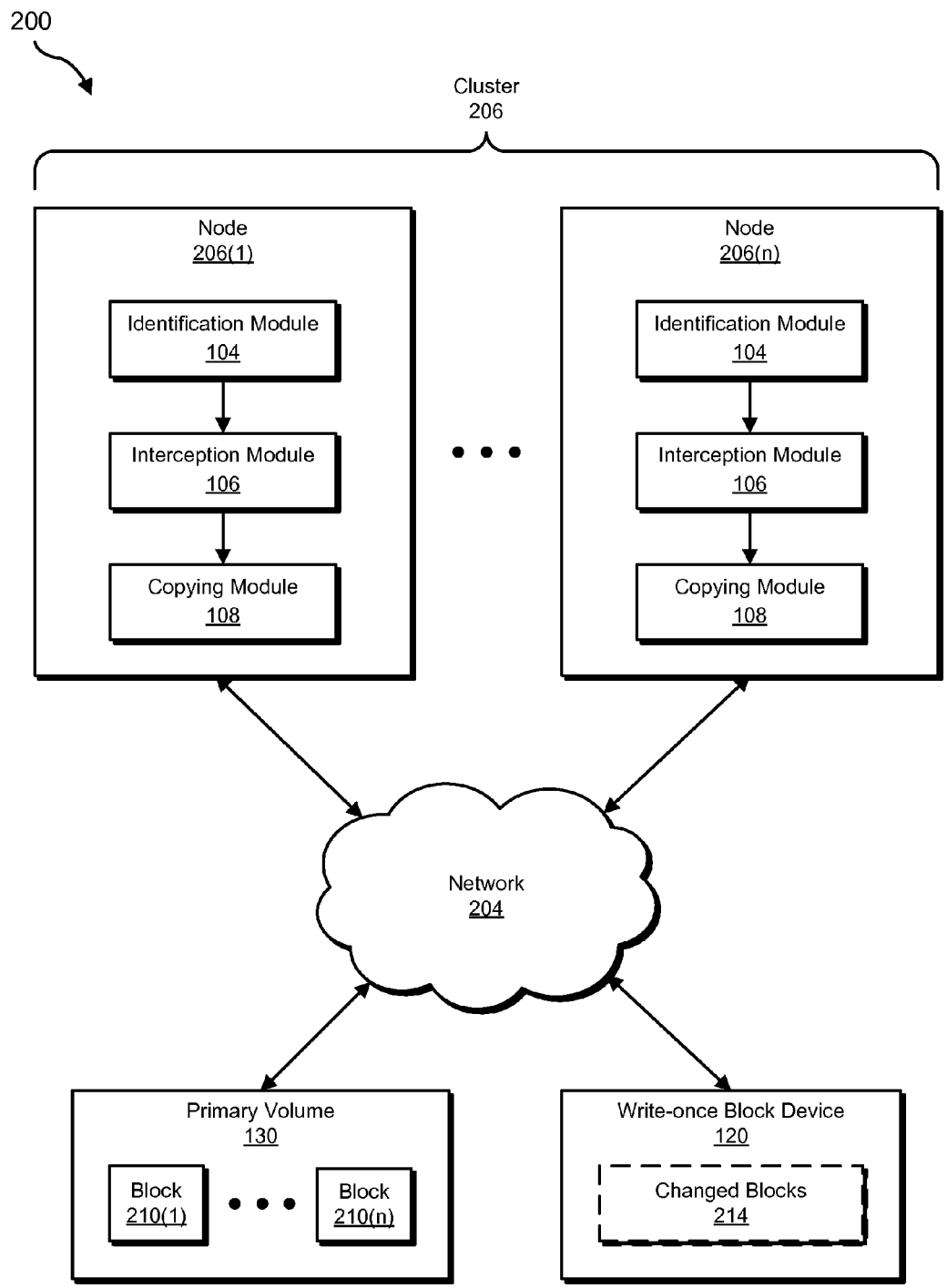
FIG. 2 is a block diagram of an exemplary system for creating snapshots.
Figure 3:
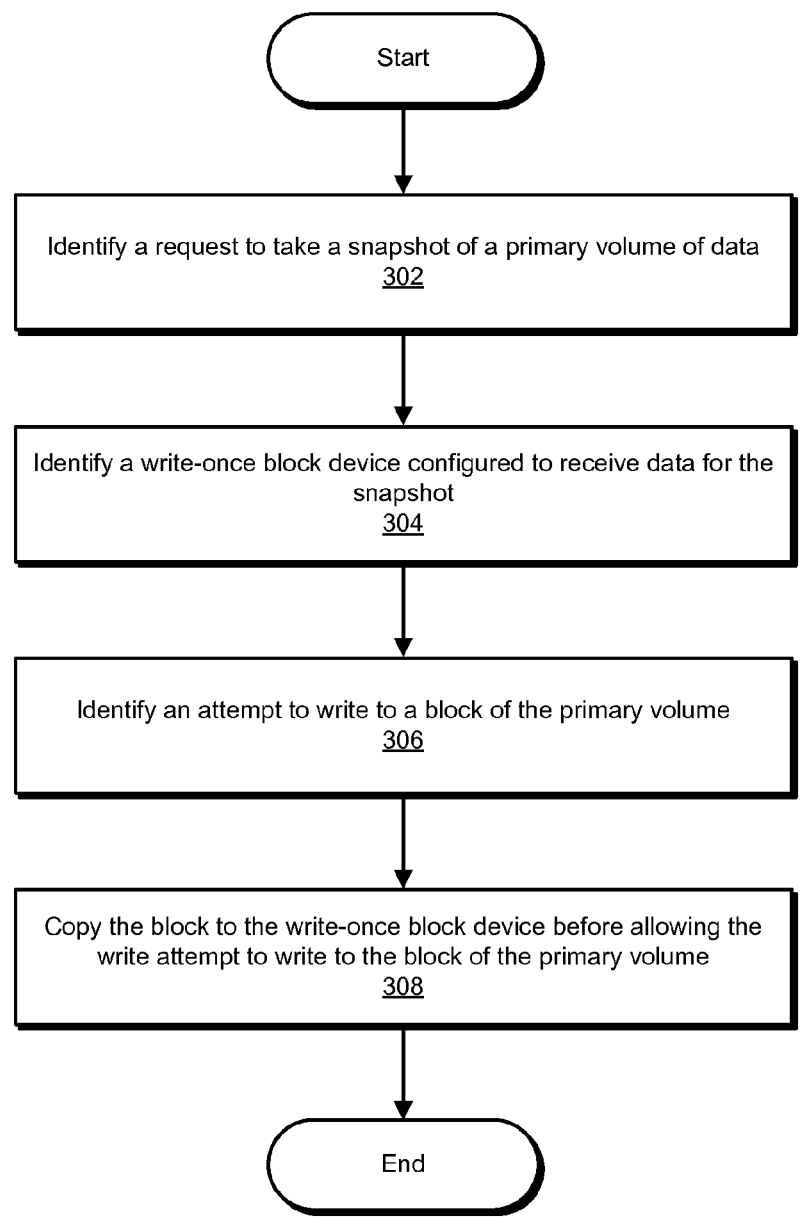
FIG. 3 is a flow diagram of an exemplary method for creating snapshots.
Figure 4:
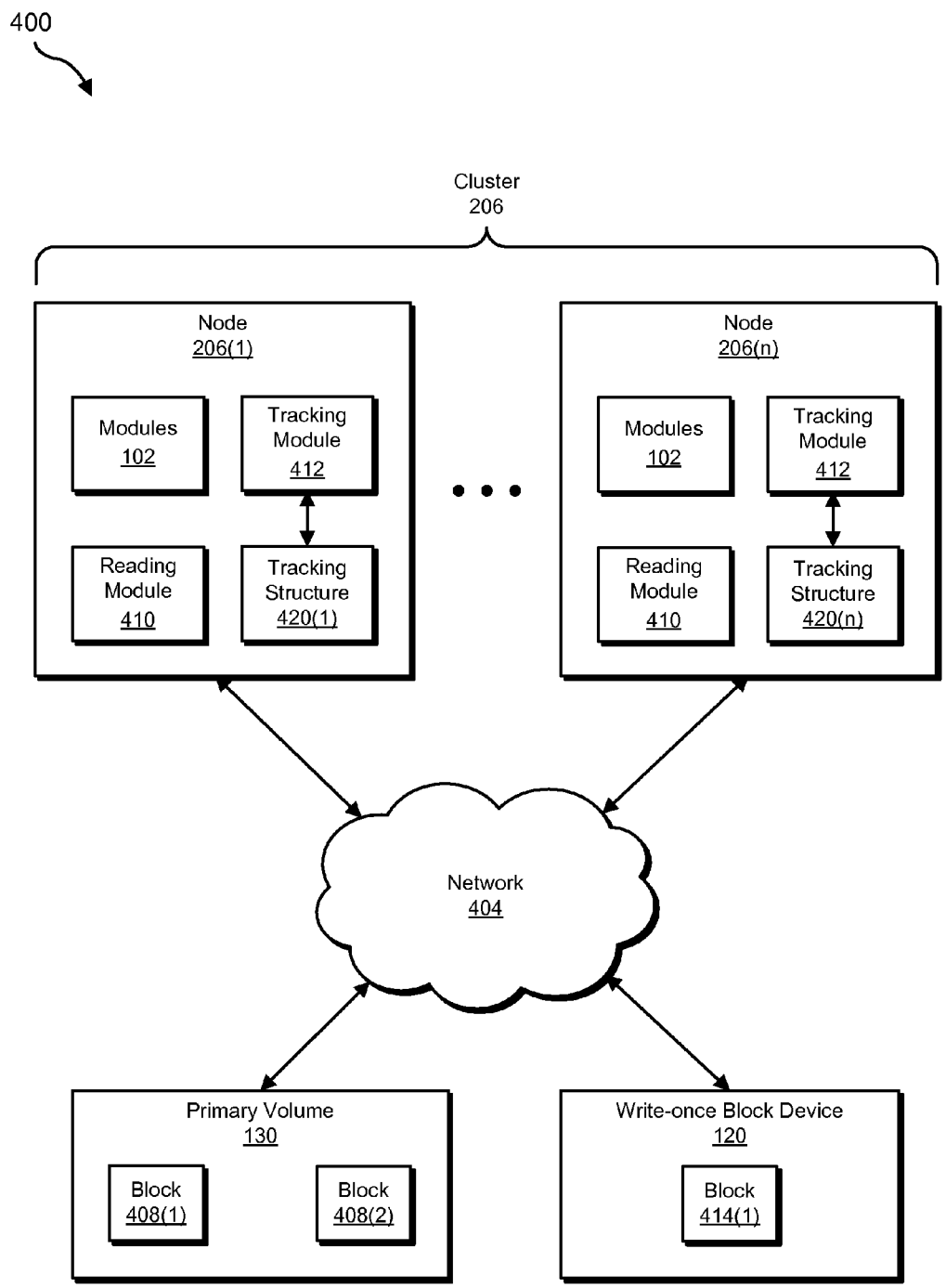
FIG. 4 is a block diagram of an exemplary system for creating snapshots.

The following will provide, with reference to FIGS. 1, 2, and 4, detailed descriptions of exemplary systems for creating snapshots. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for creating snapshots. As illustrated in this figure, exemplary system 100 may include one or more modules 102 for performing one or more tasks. For example, and as will be explained in greater detail below, exemplary system 100 may include an identification module 104 programmed to identify a request to take a snapshot of a primary volume of data and to identify a write-once block device configured to receive data for the snapshot. Exemplary system 100 may also include an interception module 106 programmed to identify an attempt to write to a block of the primary volume.

In addition, and as will be described in greater detail below, exemplary system 100 may include a copying module 108 programmed to copy the block to the write-once block device before allowing the write attempt to write to the block of the primary volume. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., cluster 206 and/or write-once block device 120), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include a write-once block device 120. Write-once block device 120 may represent portions of a computing device or a plurality of computing devices. For example, write-once block device 120 may represent a portion of computing system 510 in FIG. 5 and/or portions of exemplary network architecture 600 in FIG. 6. Alternatively, write-once block device 120 in FIG. 1 may represent one or more physically separate devices capable of being accessed by a computing device, such as computing system 510 in FIG. 5 and/or portions of exemplary network architecture 600 in FIG. 6.

Additionally, exemplary system 100 may include a primary volume 130. Primary volume 130 may represent portions of a storage device or a plurality of storage devices. For example, primary volume 130 may represent at least a portion of primary storage device 532 in FIG. 5 and/or portions of exemplary network architecture 600 in FIG. 6.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a cluster 206 with access to write-once block device 120 and primary volume 130 via a network 204. Cluster 206 may include nodes 206(1)-(n). Primary volume 130 may include data blocks 210(1)-(n). In one embodiment, and as will be described in greater detail below, one or more of nodes 206(1)-(n) may include identification module 104, interception module 106, and copying module 108.

Identification module 104 may be programmed to identify a request to take a snapshot of primary volume 130. Identification module 104 may also be programmed to identify write-once block device 120. Interception module 106 may be programmed to identify an attempt to write to a block 210(1) of primary volume 130, and copying module 108 may be programmed to copy block 210(1) to write-once block device 120 before allowing the write attempt to write to block 210(1). A copy of the original block 210(1) may accordingly constitute at least a portion of changed blocks 214 on write-once block device 120.

Cluster 206 generally represents any group of computing devices that are capable of accessing a common volume of data. Examples of nodes 206(1)-(n) in cluster 206 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), a storage area network (SAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between nodes 206(1) through 206(n). In another embodiment, network 204 may facilitate communication between nodes 206(1)-(n) and primary volume 130.

FIG. 3 is a flow diagram of an exemplary computer-implemented method 300 for creating snapshots. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a request to take a snapshot of a primary volume of data. For example, at step 302 identification module 104 may, as part of node 206(1) in FIG. 2, identify a request to take a snapshot of primary volume 130.

As used herein, the term "volume" may refer to any collection of data and/or logical unit of data and/or storage. Additionally, the term "snapshot" may refer to any representation of a volume and/or a portion of a volume in a certain state and/or point in time. In some examples, a "snapshot" may refer to a space-saving snapshot (e.g., a snapshot that references a primary volume for unchanged data).

Identification module 104 may identify the request to take the snapshot in any suitable manner. For example, identification module 104 may receive a message from an application (e.g., via an application programming interface ("API")) with an instruction to take the snapshot. Additionally or alternatively, identification module 104 may identify the request by reading a configuration file with a direction to take the snapshot. In some examples, identification module 104 may receive the request simply by being executed (e.g., instructions to take the snapshot may be included within identification module 104).

At step 304 one or more of the systems described herein may identify a write-once block device configured to receive data for the snapshot. For example, at step 304 identification module 104 may, as part of node 206(1) in FIG. 2, identify write-once block device 120.

As used herein, the term "block" may refer to any suitable unit of data. Furthermore, the term "block device" may refer to any storage device capable of storing blocks of data. In various examples, a "block device" may refer to a physical storage device, an appliance, a storage array, a virtual device, a device node, enabling software (such as a driver), and/or combinations of one or more of the same. Additionally, the term "write-once block device" may refer to any block device that will accept only one write per target address (e.g., a block device that will not allow overwriting).

Identification module 104 may identify the write-once block device in any suitable manner. For example, identification module 104 may receive a message that identifies the write-once block device. Additionally or alternatively, identification module 104 may identify the write-once block device by reading a configuration file that identifies the write-once block device. In some examples, identification module 104 may identify the write-once block device via a connection to the write-once block device.

In some examples, the write-once block device may be configured to signal an error on an attempt to read from an unwritten block. The error may include any message, communication, and/or behavioral pattern indicating that the unwritten block is unwritten and/or unreadable. As will be described in greater detail below, systems and methods described herein may read from the snapshot by reading from an address of the write-once block device and failing over to reading from a corresponding address of the primary device if the write-once block device indicates that the address is unwritten.

Systems and methods described herein may also initialize the write-once block device to an empty state (e.g., as part of configuring the write-once block device to receive data for the snapshot). For example, identification module 104 may mark each block in the write-once block device as empty. By initializing the write-once block device to an empty state, every block of the primary volume unwritten since the snapshot may reflect an unwritten state in the snapshot. Additionally or alternatively, identification module 104 may reallocate a block of the write-once block device.

The write-once block device may also include a sparse device. As used herein, the term "sparse device" may refer to any device, volume, logical disk, and/or logical storage unit for which storage space (e.g., from a physical storage device or array of devices) is allocated on an as-needed or just-in-time basis. In some embodiments, a sparse device may represent more storage space than is allocated for the sparse device (e.g., the sparse device may represent storage space equal to the size of the primary volume). In various embodiments, the sparse device may use an addressing scheme isomorphic to an addressing scheme of the primary volume. In this way, the write-once block device may accept addresses equivalent to addresses on the primary volume. Thus, the write-once block device may automatically map a correspondence between snapshot blocks and primary volume blocks.

The write-once block device may include a variety of components and may be implemented in a variety of ways. In some examples, the write-once block device may include a virtual device. For example, the write-once block device may be implemented on an appliance and/or a storage array with a target-mode driver deployed for a file system. The virtual device may be represented by a sparse file in the file system. The driver may block any write to a block after the first write (e.g., via a block-mapping API and/or by inspecting the sparse file to determine whether the block has already been written).

In some additional examples, the write-once block device may include a virtual hard disk. For example, the write-once block device may be implemented on an appliance and/or a storage array with a target-mode driver deployed for the virtual hard disk on a block device or volume. The virtual hard disk may include a map for translating virtual addresses to physical addresses. Various systems described herein may consult the map to enforce the write-once property (e.g., by inspecting the map to determine if a previous write attempt wrote to a given virtual address). In addition to or as an alternative to a virtual hard disk driver, the write-once block device may be implemented with a log-structured volume driver (e.g., on a UNIX system).

In some further examples, the write-once block device may include a thin-provisioned array. As used herein, the term "thin-provisioned" may refer to allocating storage space (e.g., from a physical storage device or array of devices) on an as-needed or just-in-time basis. In these examples, the write-once block device may be implemented with a change-tracking map (e.g., stored in non-volatile memory). Systems described herein may use the change-tracking map to enforce the write-once property of the write-once block device. In some examples, the chunk size of the thin-provisioned array may be small in order to conserve space.

At step 306 one or more of the systems described herein may identify an attempt to write to a block of the primary volume. For example, at step 306 interception module 106 may, as part of node 206(1) in FIG. 2, identify an attempt to write to block 210(1) of primary volume 130 (e.g., a write attempt by node 206(1)).

Interception module 106 may perform step 306 in any suitable manner. For example, interception module 106 may identify the attempt to write to the block by intercepting the write attempt. In some embodiments, interception module 106 may intercept a communication over a network for writing to the primary volume. Additionally or alternatively, interception module 106 may include at least a portion of a file system driver. In this example, interception module 106 may intercept the write attempt as the write attempt is processed by the file system driver.

The write attempt may be performed in a variety of contexts. For example, the write attempt may be performed by a stand-alone computing system with access to the primary volume. In some examples, the write attempt may be performed by a node in a cluster of computing systems with access to the primary volume. For example, FIG. 4 shows an exemplary system 400 for creating snapshots. Node 206(1) in FIG. 4 may attempt to write to primary volume 130. In this example, node 206(n) may also have access to primary volume 130.

In some examples, a tracking module may also record, in a tracking structure on the node, an indication that the block has changed since the snapshot. As used herein, the phrase "tracking structure" may refer to any map, list, index, bitmap, and/or other data structure suitable for tracking whether a block of a volume has changed since a snapshot. Using FIG. 4 as an example, nodes 206(1)-(n) may include corresponding tracking structures 420(1)-(n). Each node in cluster 206 may also include a tracking module 412. Node 206(1) may attempt to write to block 408(1). Tracking module 412 on node 206(1) may then indicate in tracking structure 420(1) that block 408(1) has changed.

As will be described in greater detail below, systems and methods described herein may copy the block to the write-once block device before allowing the write attempt to write to the block of the primary volume. However, a subsequent attempt to write to the block may result in a harmless but wasteful failed attempt to copy the block to the write-once block device again. Accordingly, the tracking module may also use the tracking structure to determine whether to copy blocks to the write-once block device before allowing corresponding write attempts. For example, the tracking module may identify an additional attempt to write to the block, determine from the tracking structure that the block has changed since the snapshot, and then allow the additional write attempt without copying the block to the write-once block device again. Continuing the example using FIG. 4 above, tracking module 412 on node 206(1) may identify an additional attempt to write to block 408(1). Tracking module 412 may then look up an address of block 408(1) in tracking structure 420(1) and determine that block 408(1) has changed since the snapshot (e.g., that block 408(1) has already been copied to write-once block device 120). Tracking module 412 may then allow the additional write attempt without copying block 408(1) to write-once block device 120. For example, tracking module 412 may prevent and/or block node 206(1) from copying block 408(1) to write-once block device 120 again.

By preventing some futile attempts by the same node to perform multiple copy-on-write operations at the same location on the write-once block device, systems and methods described herein may avoid wasteful network traffic and/or other wastes of computing resources. In order to further save computing resources, tracking module 412 may also share information from the tracking structure with other nodes.

For example, tracking module 412 may identify an internode communication between the node and an additional node in the cluster. The internode communication may include any communication between nodes in a cluster. For example, the internode communication may include a communication by a distributed lock manager on the node. After identifying the internode communication, tracking module 412 may include information from the tracking structure with the internode communication. For example, tracking module 412 may include information indicating which blocks have changed on the primary volume since the last internode communication. Additionally or alternatively, tracking module 412 may simply include the tracking structure. By sharing the information from the tracking structure as a part of an already existing internode communication, tracking module 412 may help the additional node prevent wasteful copy-on-write attempts while minimizing the cost of synchronizing information between nodes.

Using the earlier example with FIG. 4, tracking module 412 on node 206(1) may identify an internode communication from node 206(1) to node 206(n). Tracking module 412 may then include information from tracking structure 420(1) (e.g., information indicating that block 408(1) has been changed since the snapshot was taken) in the internode communication. Tracking module 412 on node 206(n) may then incorporate the information into tracking structure 420(n). If node 206(n) subsequently attempts to write to block 408(1), tracking module 412 may refer to tracking structure 420(n) and prevent a copy-on-write attempt.

In another example, tracking module 412 may asynchronously transmit information from the tracking structure to an additional node in the cluster. In this manner, the nodes may share tracking information and prevent some useless copy-on-write attempts without creating unwanted latency by requiring fully synchronized tracking information.

At step 308 one or more of the systems described herein may copy the block to the write-once block device before allowing the write attempt to write to the block of the primary volume. For example, at step 308 copying module 108 may, as part of node 206(1) in FIG. 2, copy block 210(1) to write-once block device 120 before allowing the write attempt to write to block 210(1) of primary volume 130.

Copying module 108 may perform step 308 in any suitable manner. For example, copying module 108 may copy the block to the write-once block device by copying the block to an address on the write-once block device equivalent to the address of the block on the primary volume. For example, the write-once block device may use relative addresses identical to the addresses of the primary volume. In this example, copying module 108 may merely copy the block to the write-once block device at the same address as the block is found on the primary volume. After step 308, method 300 may terminate.

In some examples, the systems and methods described herein may also handle attempts to read from the snapshot. For example, a reading module may identify an attempt to read the block from the snapshot. The reading module may then retrieve the block from the write-once block device. Using FIG. 4 as an example, node 206(1) may include a reading module 410. Block 408(1) may have previously been copied by copying module 108 from primary volume 130 to write-once block device 120. Reading module 410 may identify an attempt to read a block at the address of block 408(1) from the snapshot. Reading module 410 may then retrieve block 414(1) from write-once block device 120.

In various examples, reading module 410 may refer to the primary volume in order to fulfill a request to read from the snapshot. For example, reading module 410 may identify an attempt to read an additional block from the snapshot. Reading module 410 may then receive a message from the write-once block device indicating that the additional block has not been written to the write-once block device. As mentioned earlier, in some examples the write-once block device may be configured to signal an error on an attempt to read from an unwritten block. After receiving the message, reading module 410 may use data read from the primary volume (e.g., from a corresponding address of the primary volume). For example, reading module 410 may read the block from the primary volume and then attempt to read the block from the write-once block device. In this example, reading module 410 may use the block read from the write-once block device in the absence of an error from the write-once block device and use the block read from the primary volume in the presence of an error. In this manner, the snapshot may function as a space-saving snapshot.

Using FIG. 4 as an example, reading module 410 may identify an attempt to read a block at the address of block 408(2) from the snapshot. Reading module 410 may then attempt to retrieve a corresponding block from write-once block device 120, but may receive instead a message indicating that block 408(2) has not been written to write-once block device 120 since the snapshot was taken. Reading module 410 may accordingly fulfill the read attempt with block 408(2).

By writing to and reading from the write-once block device for snapshot operations, systems and methods described herein may create a snapshot for a volume accessible by a cluster without requiring that nodes of the cluster keep track of and synchronize information about the snapshot (such as which blocks of the volume have changed since the snapshot and/or the locations of blocks in the snapshot). Eliminating these requirements may reduce I/O latency, network traffic, and/or other computing resources for the cluster.

Figure 5:
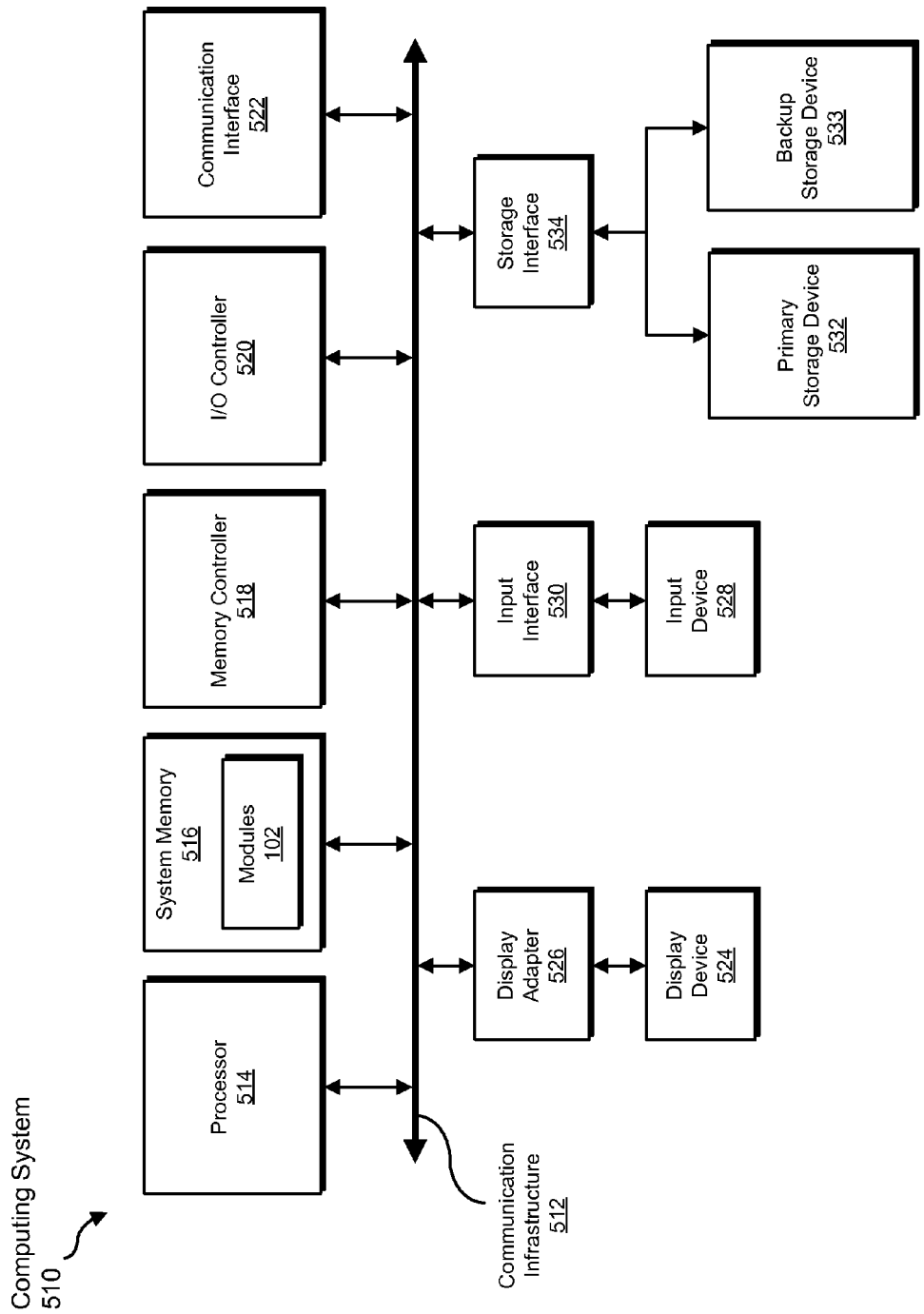
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, initializing, recording, copying, determining, allowing, including, transmitting, retrieving, receiving, and/or fulfilling steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, initializing, recording, copying, determining, allowing, including, transmitting, retrieving, receiving, and/or fulfilling.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, initializing, recording, copying, determining, allowing, including, transmitting, retrieving, receiving, and/or fulfilling steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, initializing, recording, copying, determining, allowing, including, transmitting, retrieving, receiving, and/or fulfilling steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, initializing, recording, copying, determining, allowing, including, transmitting, retrieving, receiving, and/or fulfilling steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, initializing, recording, copying, determining, allowing, including, transmitting, retrieving, receiving, and/or fulfilling steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
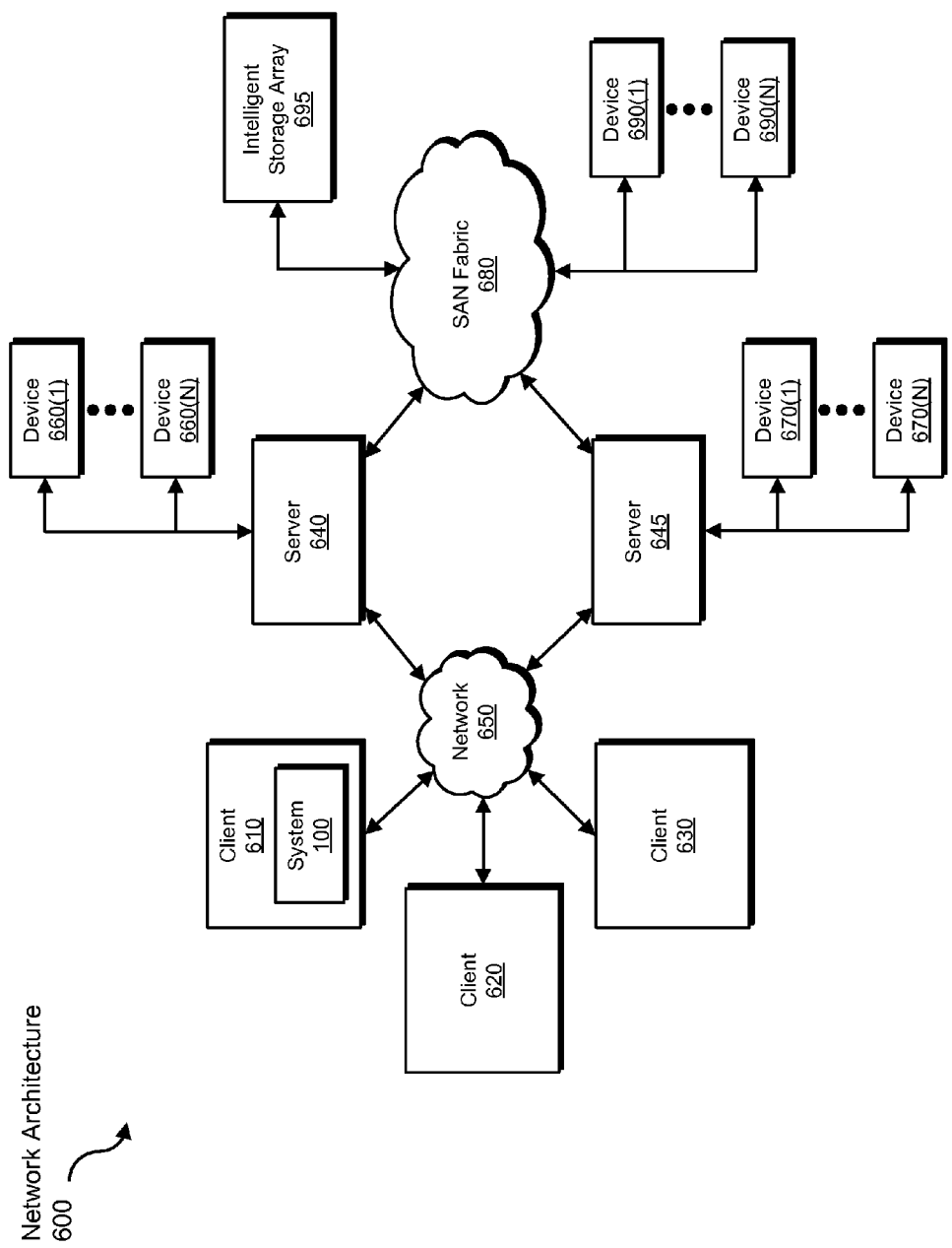
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, initializing, recording, copying, determining, allowing, including, transmitting, retrieving, receiving, and/or fulfilling steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for creating snapshots.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing device into a device for efficient snapshots in a cluster context. As another example, one or more of the modules described herein may transform a primary volume and write attempts into a snapshot.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for creating snapshots, at least a portion of the method being performed by a computing device comprising at least one processor, the method comprising:
    identifying a request to take a snapshot of a primary volume of data;
    identifying a write-once block device configured to receive data for the snapshot, wherein the write-once block device is further configured to signal an error on an attempt to read from an unwritten block;
    identifying an attempt to write to a block of the primary volume;
    copying the block of the primary volume to the write-once block device before allowing the write attempt to write to the block of the primary volume.

2. The computer-implemented method of claim 1, wherein the write-once block device comprises a sparse device.

3. The computer-implemented method of claim 1, further comprising:
    identifying an attempt to read the block from the snapshot;
    retrieving the block from the write-once block device.

4. The computer-implemented method of claim 1, further comprising:
    identifying an attempt to read an additional block from the snapshot;
    receiving a message from the write-once block device indicating that the additional block has not been written to the write-once block device;
    fulfilling the read attempt from the primary volume.

5. The computer-implemented method of claim 1, wherein the write attempt comprises a write attempt by a node in a cluster of computing systems with access to the primary volume.

6. The computer-implemented method of claim 5, further comprising recording, in a tracking structure on the node, an indication that the block has changed since the snapshot.

7. The computer-implemented method of claim 6, further comprising:
    identifying an additional attempt to write to the block;
    determining from the tracking structure that the block has changed since the snapshot;
    allowing the additional write attempt without copying the block to the write-once block device again.

8. The computer-implemented method of claim 6, further comprising:
    identifying an internode communication between the node and an additional node in the cluster;
    including information from the tracking structure with the internode communication.

9. The computer-implemented method of claim 6, further comprising asynchronously transmitting information from the tracking structure to an additional node in the cluster.

10. The computer-implemented method of claim 1, further comprising initializing the write-once block device to an empty state.

11. The computer-implemented method of claim 1, wherein the write-once block device comprises at least one of:
    a virtual device;
    a virtual hard disk;
    a thin-provisioned array device.

12. A system for creating snapshots, the system comprising:
    an identification module programmed to:
        identify a request to take a snapshot of a primary volume of data;
        identify a write-once block device configured to receive data for the snapshot, wherein the write-once block device is further configured to signal an error on an attempt to read from an unwritten block;
    an interception module programmed to identify an attempt to write to a block of the primary volume;
    a copying module programmed to copy the block to the write-once block device before allowing the write attempt to write to the block of the primary volume;
    the write-once block device;
    at least one processor configured to execute the identification module, the interception module, and the copying module.

13. The system of claim 12, wherein the write-once block device comprises a sparse device.

14. The system of claim 12, further comprising a reading module programmed to:
  identify an attempt to read the block from the snapshot;
  retrieve the block from the write-once block device.

15. The system of claim 12, further comprising a reading module programmed to:
  identify an attempt to read an additional block from the snapshot;
  receive a message from the write-once block device indicating that the additional block has not been written to the write-once block device;
  fulfill the read attempt from the primary volume.

16. The system of claim 12, wherein the write attempt comprises a write attempt by a node in a cluster of computing systems with access to the primary volume.

17. The system of claim 16, further comprising a tracking module programmed to record, in a tracking structure on the node, an indication that the block has changed since the snapshot.

18. A non-transitory computer-readable-storage medium comprising one or more computer-executable instructions that, when executed by at least one processor of a computing device, cause the computing device to:
  identify a request to take a snapshot of a primary volume of data;
  identify a write-once block device configured to receive data for the snapshot;
  identify an attempt to write to a block of the primary volume, wherein the write attempt comprises a write attempt by a node in a cluster of computing systems with access to the primary volume;
  copy the block to the write-once block device before allowing the write attempt to write to the block of the primary volume;
  record, in a tracking structure on the node, an indication that the block has changed since the snapshot;
  identify an additional attempt to write to the block;
  determine from the tracking structure that the block has changed since the snapshot;
  allow the additional write attempt without copying the block to the write-once block device again.

* * * * *